Patented Feb. 21, 1950

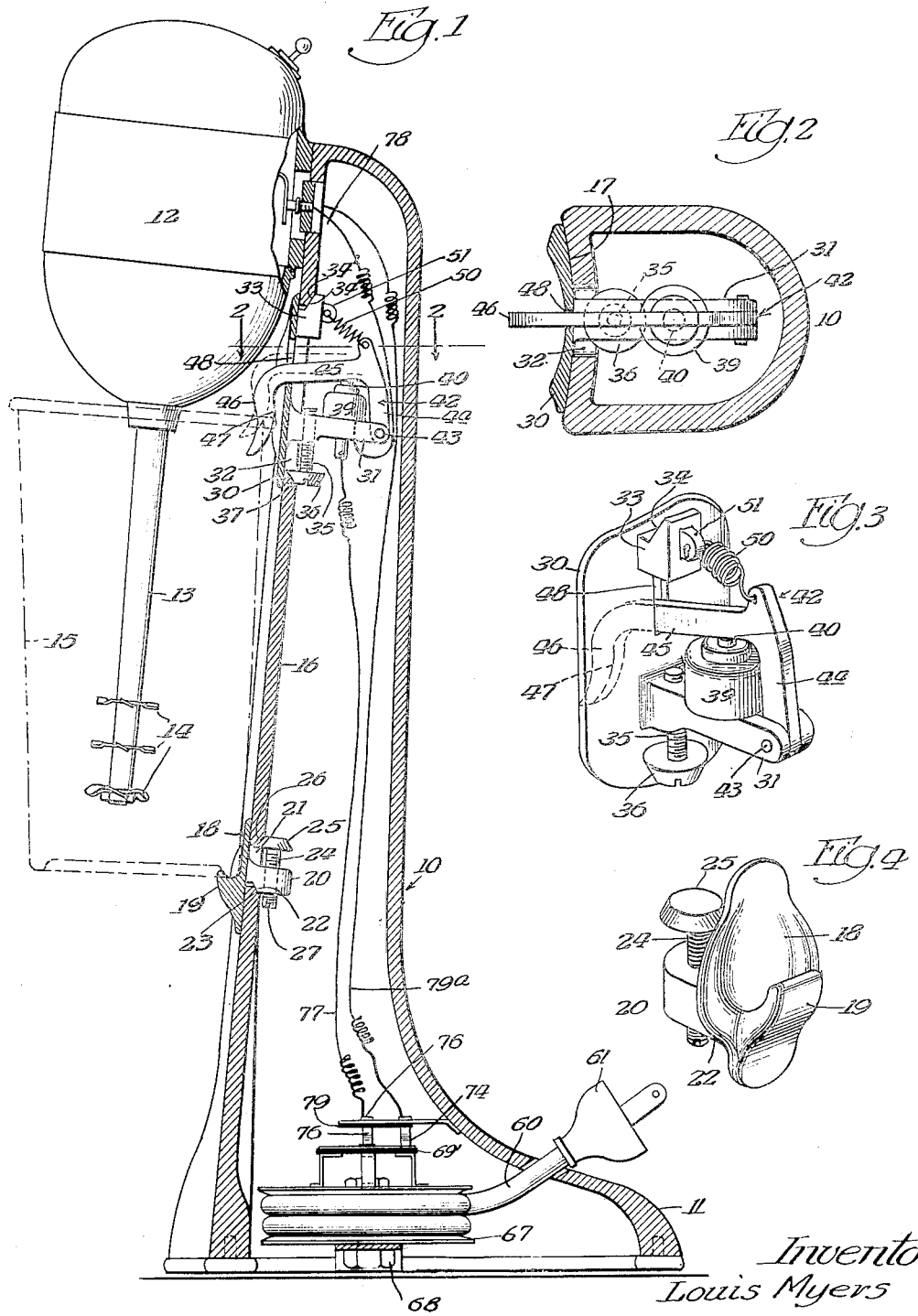

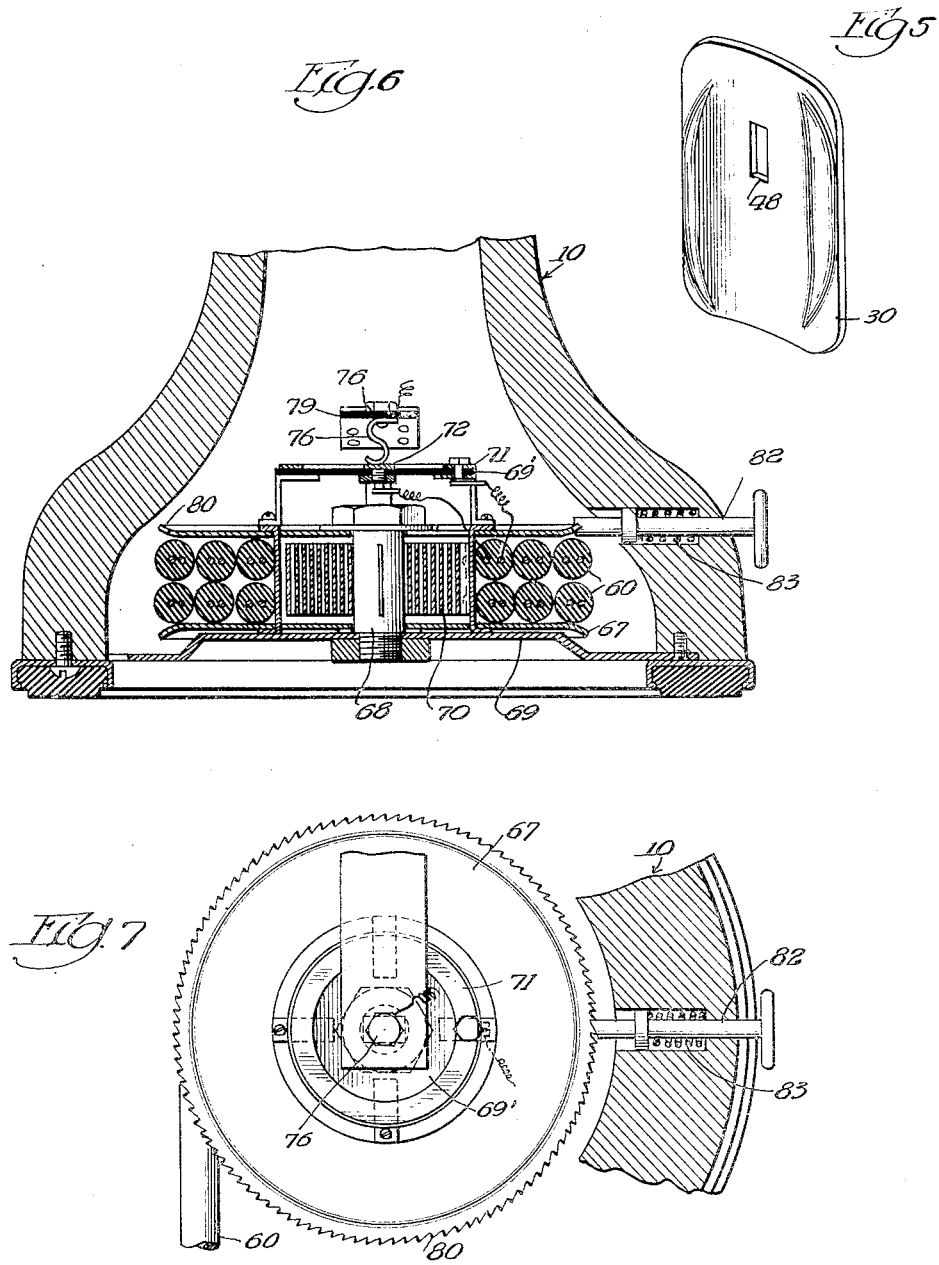

2,498,570

UNITED STATES PATENT OFFICE 2,498,570

DRINK MIXER

Louis Myers, Rockford, Ill.

Application March 10, 1945, Serial No. 582,035

3 Claims. (Cl. 259—135)

The invention relates to drink mixers.

One object of the invention is to provide a drink mixer of the type in which the motor with a depending agitator shaft is supported at the upper end of a standard with improved means for supporting the mixing receptacle on the column.

Another object of the invention is to provide improved means for securing and supporting plates which are engaged by the receptacle on the front of the standard.

A still further object of the invention is to provide a supporting plate on the front of the standard for a switch operating lever which is supported in the standard and positioned so that liquid being mixed will not be splashed into the slot through which the lever extends.

Another object of the invention is to provide a drink mixer with improved take-up means for the conductor cord which supplies current to the motor.

Other objects will appear from the detailed description.

In the drawings:

Fig. 1 is a central vertical section through a mixer embodying the invention, the motor and agitator shaft being shown in elevation.

Fig. 2 is a section taken on line 2—2 of Fig. 1.

Fig. 3 is a perspective viewed from the back, of the plate for supporting the receptacle controlled switch-lever, with the switch-lever and switch mounted thereon.

Fig. 4 is a perspective of the plate for supporting the bottom of the receptacle.

Fig. 5 is a perspective viewed from the front of the supporting plate for the switch-lever.

Fig. 6 is a transverse section of the lower portion of the standard and the take-up device for the electric cord.

Fig. 7 is a plan of the take-up device, a portion of the standard being shown in section.

The invention is exemplified in a drink mixer which comprises a hollow standard 10, the lower portion of which is extended to form a base 11, and an electric motor 12 secured to the front and upper end of the standard and provided with a depending motor-shaft 13 on which agitators 14 are secured. The drink mixer is of the type which is provided with means for holding a receptacle 15 (indicated by dotted lines) in operative position on the front of the standard, and switch means for starting the motor upon placement of the receptacle in its operative position around the agitator shaft, and stopping the motor when the receptacle is removed. This supporting means for the receptacle comprises a bottom supporting member and a spring pressed lever for holding the upper portion of the receptacle in its operative position. The front face 17 of the front wall 16 of the standard is cylindrically curved in cross-section to function as a vertical guide for the rim of the receptacle as it is moved vertically into and out of operative position around the agitator. The bottom supporting device comprises a plate 18, the back face of which is cylindrically convex to fit the concave front face 17, a hook 19 integrally formed with and projecting from the front of the plate for receiving the bead usually provided around the lower end of the receptacle, and a lug 20 integral with and on the back of the plate and adapted to extend through a vertical extending slot 21 in the front wall 16 of the standard. The plate 18 is removably clamped against the front face of front wall 16 by a rearwardly and downwardly inclined wedge surface 22 which is formed on the lower end of lug 20 and adapted to engage a correspondingly inclined wedge surface 23 formed on the wall 16 at the lower end of slot 21, and a screw 24, the stem of which extends through and is screw-threaded to lug 20. Screw 24 is provided with an upwardly convergent conical head 25 which is adapted to engage a wedge surface 26 formed on wall 16 at the upper end of slot 21. The slot 21 is of sufficient width to permit the head 25 of screw 24 and the lug 20 to pass therethrough. The lower end of the stem of the screw is provided with a groove 27 for receiving a screw-driver for rotating the screw.

In practice the outer surface of the standard and base are usually porcelain enameled for sanitary purposes and the plate 18 and hook 19 have a chromium or nickel-plated finish and it is advantageous to provide means for securing the supporting plate 20 which does not require drilling or other machining of the standard which is likely to mar or crack the enamel on the standard.

In assembling the bottom support for the receptacle with the standard, the screw 24 is turned in lug 20 so the conical head 25 will be in close proximity of upper end of lug 20. The plate is then tilted and the lower end of the screw passed through the slot 21 and then the plate is moved to pass the screw-head 25 through the slot until the back face of plate 18 engages the front face of the wall 16. The screw 24 is then turned by a screw-driver applied through the bottom base so that its conical head 25 will have wedging engagement with the wedge-face 26 at the upper end of the slot 21 and the wedge-face 22 on lug 20 will have a tight engagement with the wedge-face 23 at the lower end of the slot. The front plate 18 and hook 19 will then be securely clamped in its operative position on the front of the standard for engagement by the bottom of the receptacle, when the latter is raised to its operative position around the agitator shaft. This exemplifies wedging means for securing the receptacle supporting plate against the front face of the standard which functions without requiring the drilling of screw holes in the standard or machining the outer enameled face of the standard. This wedging means firmly draws the plate 18 into tight engagement with the front face of the wall 16 of the standard so that spilled liquid cannot leak between the plate and the standard or through the slot 21.

The device for supporting the lever which is engageable by the upper rim of the receptacle for holding the receptacle on the lower plate 18 and hook 19 and for shifting the switch which automatically controls the operation of the motor upon placement or removal of the receptacle in its operative position, comprises a plate 30, the back face of which is cylindrically convex to conform to the concave guide face 17 of the standard; a lug or arm 31 integral with plate 30 and adapted to extend through a vertical slot 32 in the front wall 16 of the standard; a lug 33 integral with, on the back of plate 30 adjacent its upper end, and provided with an upwardly and rearwardly inclined wedge-face 34 which is adapted to engage a wedge-face 34' on the wall 16 at the upper end of slot 32; and a screw 35 which is threaded to arm 31 and has a depending downwardly convergent conical head 36 which is adapted to engage a wedge face 37 on wall 16 at the lower end of slot 32. An electric switch 39 of the switch-button type is mounted on the top of arm 31 and is electrically connected to close the circuit for motor 12 when its button 40 is depressed. Lever, generally designated 42, is pivoted at 43 to the inner end of arm or lug 31 and comprises an integral upwardly extending member 44, an integral forwardly extending member 45 adapted to engage button 40, and an integral depending hook-member 46 at the front end of member 45 and provided with a curved or cam surface 47 which is adapted to be engaged by the upper rim of the receptacle to swing the lever upwardly to release the button 40. Plate 30 is provided with a slot 48 through which the member 45 of the switch-lever extends. A spring 50 is connected to the switch-lever and to an ear 51 integrally formed with the lug 33 for pressing the lever so its hook 46 will be normally disposed in the path of the rim of the receptacle, and hold the upper rim of the receptacle against the front of plate 30. The movement of lever 42 by spring 50 is limited by the lower end of slot 48. Switch-button 40, as well understood in the art, is spring-pressed to close the switch 39 when the button is released by the movement imparted to the lever 42 by the engagement of the receptacle with the cam 47 on hook 46. The slot 32 in the wall 16 is of sufficient width to permit the screw-head 36 and the switch 39 to pass therethrough. The plate 30 serves as a cover for slot 32 in the front wall 16 of the standard. In assembling the plate 30 with the standard, the switch-lever 42 and switch 39 are assembled on arm 31 and the screw 35 turned so it will be disposed in close proximity to arm 31. The lug 33, arm 31, screw 35, switch 39 and the portion of the lever 42 in back of plate 30 are inserted into the standard through the slot 32. The screw 35 is then turned by a screw-driver inserted through the base of the standard, to force its conical head 36 into engagement with wedge-face 37 at the lower end of slot 32 and to force the wedge surface 34 on lug 33 into engagement with wedge surface 34' at the upper end of slot 32 in the standard. This wedging action of the screw-head 36 and wedge-face 34' on lug 33 against wedge faces 34' and 37 on the standard will jam the back plate of face 3 against front face 17 of wall 16. This exemplifies a construction in which the mounting plate 30 for the switch 39 and lever 42 is secured on the front face of the standard without screw holes or machining on the porcelain enameled outer faces of the standard. The plate 30 and lever 42 are usually chromium or nickel-plated and the standard is enameled before these parts are assembled together. A characteristic of the lever 42 is that substantially all portions of the lever except the lower portion of the hook which is engaged by the receptacle, are enclosed in the standard and located above the liquid splashed around the receptacle by the agitator. The wedging means removably secures the plate and parts mounted thereon so they will not be loosened by vibration. The means for securing the plates 18 and 30 are not visible from the outside of the mixer, so they present an attractive appearance.

In the operation of the mixer, the operator will lift the receptacle 15 upwardly around the agitator 14 and shaft 13 while the receptacle is guided vertically by the front face 17 of the standard. When the upper rim of the receptacle engages the cam-surface 47 on hook 46, spring 50 will press lever 42 against the front face of plate 30, and the lower end of the receptacle may then be lowered so that usual bead in the bottom of the receptacle will rest in and be held by hook 19 and the receptacle will be held at its top and bottom in its operative position around the agitators. The rim of the receptacle as it is forced upwardly between the front face of plate 30 and hook-member 46, will shift the lever 42, so its member 45 will release the button 40 of switch 39 which is spring-pressed to its circuit-closing position, to close the circuit for the motor and cause it to continue to operate until the receptacle is withdrawn by its reverse manipulation away from the standard.

In practice, current for the operation of the motor is supplied by a cord with a switch-plug adapted to be connected to a wall-socket. It is frequently desired to place the mixer in different locations relatively to the electric socket, and for this purpose it is desirable to provide simple take-up means for the conductor cord to prevent loose loops between the socket and the mixer. The conductor cord 60 is wound on a reel 67 which is journalled on a stud 68 which is rigidly supported by a cross-bar 69 in the base 11. A convolute spring 70 has one of its ends connected to reel 67 and its other end connected to stud 68. A switch-plug 61 is connected to the free end of the conductor cord 60. One of the conductors of cord 60 is electrically connected to a ring 71 which is supported on a plate of insulation 69' which is rotatable with reel 67. The other conductor of cord 60 is connected to a terminal contact 72 on the plate of insulation 69' and is rotatable with the reel 67. A brush-contact 74 is supported on a strip 79 of insulating material which is stationarily supported in base 11, adapted to engage ring 71, and connected by a conductor 79a to the motor 12. A brush-contact 76 also mounted on and insulated from strip 79 engages the contact 72 and is connected by a conductor 77 to one member of switch 39. The other member of switch 39 is connected by conductor 78 to the motor. Ratchet teeth 80 are formed in the rim of one of the sides of reel 67. A stem 82 slidably mounted in one side of the base 11 is normally pressed by a spring 83 into engagement with said teeth to arrest the winding of cord 60 onto the reel 67. When it is desired to move the mixer away from the switch-socket to which the switch-plug 61 is connected, the ratchet teeth 80 will permit the rotation of the wheel for unwinding the cord therefrom. When it is desired to move the mixer toward the switch-socket, the operator will pull stem 82 outwardly against the force of spring 83 and permit the spring 70 to take up the slack in the cord.

The invention exemplifies simple and efficient means for supporting the receptacle and controlling the motor which are adapted to be assembled with the standard without requiring any drilling of holes in the standard and which are adapted to be secured on the standard without marring or cracking the porcelain enamel on the standard. The invention also exemplifies a unitary assembly of a cover-plate, wedge-means, switch-lever and switch, which is adapted to be readily mounted in the hollow standard.

The invention is not to be understood as limited to the details described, since these may be modified within the scope of the appended claims without departing from the spirit and scope of the invention.

Having thus described the invention, what I claim as new and desire to secure by Letters Patent is:

1. A drink mixer comprising: an electric motor, an agitator depending from and driven by the motor, a hollow standard on the upper end of which the motor is supported and provided with a front wall having a slot therein, a plate fitting the front end of the standard and covering the slot, a spring pressed lever extending through the plate and provided at the front thereof with a depending hook for holding the rim of a receptacle operatively positioned on the standard, a member rigid with and projecting rearwardly from the plate, on which the inner end of the lever is fulcrumed inside of the standard, an electric switch for controlling the motor, supported on said member and inside of the standard, and wedge means mounted on the plate and projecting rearwardly therefrom and engaging the front wall for clamping the plate against the front face of the standard, said wedge means being insertable through the slot and invisible from the front of the plate.

2. A drink mixer comprising: an electric motor, an agitator depending from and driven by the motor, a hollow standard on the upper end of which the motor is supported and provided with a front wall having a slot therein, a plate fitting the front end of the standard and covering the slot, a spring pressed lever extending through the plate and provided at the front thereof with a depending hook for holding the rim of a receptacle operatively positioned on the standard, a member rigid with and projecting rearwardly from the plate, on which the inner end of the lever is fulcrumed inside of the standard, an electric switch for controlling the motor, supported on said member and inside of the standard, and wedge means mounted on the plate and projecting rearwardly therefrom and engaging the front wall at the ends of the slots for clamping the plate against the front face of the standard, said wedge means being insertable through the slot and invisible from the front of the plate and including a hook-member rigid with, and a member adjustably on, the inner side of the plate, and engaging the wall at the ends of the slot respectively.

3. A drink mixer comprising: an electric motor, an agitator depending from and driven by the motor; a hollow standard on the upper end of which the motor is supported provided with a front wall having a pair of vertical slots therein; a plate provided with a rest for the bottom of the receptacle fitting the front of the standard and covering one of the slots; wedge-means on the back of the plate, invisible from the front of the plate, and insertable through one of the slots for clamping said plate against the front face of the standard; a second plate covering the other slot; a support on the back of the second plate extending into the standard; a switch for controlling the motor mounted on the support; a spring pressed switch operating lever pivoted to the support in back of the switch and provided with a forwardly extending member extending through said slot and a depending member engageable by a receptacle for shifting the lever, the second plate being provided with a slot through which the lever extends; and wedge-means on the back of the second plate, insertable through its associated slot, invisible from the front of the standard for clamping the second plate against the front face of the standard.

LOUIS MYERS.

REFERENCES CITED

The following references are of record in the file of this patent:

UNITED STATES PATENTS

| Number | Name | Date |
| --- | --- | --- |
| 1,711,396 | Ruetz | Apr. 30, 1929 |
| 1,909,986 | Ruetz | May 23, 1933 |
| 2,008,223 | Partz | July 16, 1935 |
| 2,136,355 | Fredenhagen et al. | Nov. 8, 1938 |
| 2,146,710 | Bloomfield | Feb. 14, 1939 |